United States Patent
Umlauf

(10) Patent No.: US 12,237,677 B2
(45) Date of Patent: Feb. 25, 2025

(54) POWER-ELECTRONIC DEVICE COMPRISING A TRANSFORMER UNIT AND METHOD

(71) Applicant: SMA Solar Technology AG, Niestetal (DE)

(72) Inventor: Sebastian Umlauf, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 18/612,637

(22) Filed: Mar. 21, 2024

(65) Prior Publication Data

US 2024/0235195 A1    Jul. 11, 2024

Related U.S. Application Data

(63) Continuation of application No. 17/076,084, filed on Oct. 21, 2020, now Pat. No. 11,942,785, which is a (Continued)

(30) Foreign Application Priority Data

Apr. 24, 2018 (DE) .................... 10 2018 109 868.5

(51) Int. Cl.
| | | |
|---|---|---|
| *H02M 7/44* | (2006.01) | |
| *H01F 27/26* | (2006.01) | |
| *H01F 27/28* | (2006.01) | |
| *H01F 27/40* | (2006.01) | |
| *H02J 3/01* | (2006.01) | |
| *H02J 3/24* | (2006.01) | |

(Continued)

(52) U.S. Cl.
CPC ................ *H02J 3/01* (2013.01); *H01F 27/26* (2013.01); *H01F 27/28* (2013.01); *H01F 27/40* (2013.01); *H02J 3/241* (2020.01); *H02J 3/26* (2013.01); *H02J 3/38* (2013.01); *H02M 7/44* (2013.01); *H02J 3/36* (2013.01)

(58) Field of Classification Search
CPC ...... H02J 3/01; H02J 3/241; H02J 3/26; H02J 3/38; H02J 3/36; H01F 27/26; H01F 27/28; H01F 27/40; H02M 7/44
See application file for complete search history.

(56) References Cited

U.S. PATENT DOCUMENTS

| | | |
|---|---|---|
| 5,093,646 A | 3/1992 | Herbert |
| 7,362,206 B1 | 4/2008 | Herbert |

(Continued)

FOREIGN PATENT DOCUMENTS

| | | |
|---|---|---|
| DE | 102013200520 A1 | 7/2014 |
| DE | 202016104544 U1 | 9/2016 |

OTHER PUBLICATIONS

International Search Report dated May 17, 2019 in connection with PCT/EP2019/059571.

(Continued)

*Primary Examiner* — Adolf D Berhane
(74) *Attorney, Agent, or Firm* — Eschweiler & Potashnik, LLC

(57) ABSTRACT

The disclosure relates to a power electronics device having at least two inverters and a transformer apparatus having a core arrangement, at least one primary winding and at least one secondary winding that wind around the core arrangement at least in sections.

17 Claims, 8 Drawing Sheets

Related U.S. Application Data continuation of application No. PCT/EP2019/059571, filed on Apr. 12, 2019.

(51) Int. Cl.
*H02J 3/26* (2006.01)
*H02J 3/38* (2006.01)
*H02J 3/36* (2006.01)

(56) References Cited

U.S. PATENT DOCUMENTS

| | | | |
|---|---|---|---|
| 7,830,681 B2 * | 11/2010 | Abolhassani | H02M 7/49 363/37 |
| 11,942,785 B2 * | 3/2024 | Umlauf | H02M 7/44 |
| 2006/0285370 A1 | 12/2006 | Lee | |
| 2008/0049468 A1 | 2/2008 | Wei | |
| 2021/0210278 A1 * | 7/2021 | Pasterczyk | H01F 38/023 |

OTHER PUBLICATIONS

Notice of Allowance dated Nov. 22, 2023, for U.S. Appl. No. 17/076,084.

* cited by examiner

POWER-ELECTRONIC DEVICE COMPRISING A TRANSFORMER UNIT AND METHOD

CROSS REFERENCE TO RELATED APPLICATIONS

This Application is a Continuation of U.S. application Ser. No. 17/076,084, filed on Oct. 21, 2020 which is a continuation of International Patent Application number PCT/EP2019/059571, filed on Apr. 12, 2019, which claims priority to German Patent Application number 10 2018 109 868.5, filed on Apr. 24, 2018, and is hereby incorporated by reference in its entirety.

FIELD

The disclosure relates to a power electronics device having at least two inverters and a transformer apparatus.

The disclosure also relates to a transformer apparatus that is able to be used as a transformer apparatus of the power electronics device.

The disclosure also relates to a method for damping high-frequency components in the output current of a power electronics device. The method may be performed using the power electronics device according to the disclosure.

BACKGROUND

Power electronics devices of the type mentioned at the outset are known from the prior art, for example, as a component of systems having energy sources that generate DC voltage for feeding electrical energy into a medium-voltage grid. Systems having power electronics devices of the type mentioned at the outset may comprise, for example, wind turbines and/or solar modules and/or batteries as energy sources. Such systems may be equipped with a plurality of inverters, which are then each assigned, for example, to a subunit of energy sources. The individual inverters are also referred to as power stages (stacks). In the case of extensive systems having correspondingly high powers, such a configuration with a plurality of inverters is often less expensive than using a single, correspondingly powerful central inverter. The power stages convert the DC voltage provided by the subunit of the system into AC voltage. The inverters may be single-phase or multiphase inverters, for example, three-phase inverters. The inverters may also be unidirectional or bidirectional inverters. The inverters may comprise a corresponding number of half-bridges to which a DC voltage is applied on the input side and, by virtue of clocking power semiconductor switches of the half-bridges, provide an approximately sinusoidal current at the individual phase outputs of the inverter, on which current high-frequency current ripples are superimposed. These current ripples may also be referred to as high-frequency components in the output current. The output voltage of the inverter also accordingly comprises high-frequency components in the output voltage. Choke coils connected downstream of the half-bridges are known for damping the high-frequency components of the output current or output voltage. The output lines, to which the same phase is applied, of the at least two inverters are usually combined downstream of a first choke coil and routed through a second choke coil. In the case of the known power electronics devices of the type mentioned at the outset, the output voltage damped in this way is then fed to a transformer on the primary side in order to adapt a voltage level and/or for galvanic isolation.

The inductance of the individual windings of the choke coils (also called sinusoidal filter chokes) and their coupling to the respective other sinusoidal filter chokes are decisive for the current distribution of the individual power stages (inverters, stacks). Despite high manufacturing accuracies, large deviations in the current symmetry may sometimes occur. This results in output losses as soon as one of the power electronics stages (stack) has reached its maximum output current. In such a case, the installed material is not fully controlled and, under certain circumstances, the sum of the inverters is not able to produce the desired rated power. When using a plurality of inverters in a power electronics device of the type mentioned at the outset, it is also disadvantageous that the number of sinusoidal filter chokes that are required increases, and these may each weigh several hundred kilograms and exhibit losses. The losses lead to a reduction in the efficiency of the power electronics device, for example, by about 0.5% when the inverter is fully controlled. The losses of the sinusoidal filter chokes additionally have to be dissipated by way of a cooling system, thereby increasing the costs for thermal management and the structural volume of the power electronics device.

SUMMARY

The disclosure is directed to specifying a power electronics device, a transformer apparatus, and a method, by way of all of which said disadvantages of the prior art are able to be at least partially reduced or completely avoided.

In the case of a power electronics device, a core arrangement comprises at least two rows of core limbs arranged adjacent to one another, wherein the core limbs are connected to one another via yoke connections in each row. There is additionally at least one special electrical connection present between a phase output of an inverter and a primary winding start of a primary winding of the transformer apparatus, wherein the following applies to such a special electrical connection:

In one embodiment the primary winding start of the primary winding is electrically connected to exactly one phase output of one of the inverters and the primary winding is essentially wound around a core section, adjoining a first core window, of a row. At least one second primary winding, electrically connected to at least one of the inverters (in particular another inverter), of the same phase is additionally essentially wound around a core section adjoining a core window of another row, which core section is spaced from the first core window. A secondary winding of the same phase is also wound in sections around a core section adjoining the first core window and around a core section adjoining the second core window.

In the context of this disclosure, the term "special electrical connection" may also be referred to as "specially damped electrical connection". In the context of this disclosure, the term "specially damped electrical connection" does not refer to damping components within the connection (such components may be present, but do not have to be present), but rather to damping of an output voltage transmitted via this connection in the region of the transformer apparatus. The terms "specially damped electrical connection" and "special electrical connection" may also be understood as a name for such a connection. Since an output voltage transmitted via the "special electrical connection"/

"specially damped electrical connection" is damped in the region of the transformer apparatus, the inverter may in particular be designed to be free from choke coils in the inside thereof between a half-bridge of the inverter that is connected to the phase output and the phase output, as may the special electrical connection/specially damped electrical connection.

The primary windings each have a primary winding start and end. In the context of this disclosure, a single primary winding is also considered to be a winding that is arranged in layers with spacings between series-connected subunits of the primary winding on the core arrangement or, in other words, is formed by a series connection and/or parallel connection of sub-primary windings.

If a primary winding start of a primary winding is connected to exactly one inverter and a primary winding start of a further primary winding is connected to exactly one other inverter, the two primary windings are therefore not electrically connected, except possibly at their primary winding ends. By way of example, in the context of this disclosure, primary windings whose primary winding starts are connected to different inverters may be electrically connected at their primary winding ends via a common reference potential. Each phase output of an inverter corresponds to one or more primary windings of the transformer apparatus, wherein the primary winding starts are electrically connected to the phase output of the inverter. In the following text, the expression "the primary winding is assigned to an inverter" should be understood to mean that its primary winding start is electrically connected to a phase output of the inverter. The expression "the primary winding is assigned to a phase output" should also be understood to mean that its primary winding start is electrically connected to the phase output.

The primary winding ends may be electrically connected to one another via a common reference potential. The reference potential may for example, be a neutral conductor. This embodiment of the disclosure may be provided in particular in the case of single-phase inverters. If the inverters have a plurality of phases, the phase shift of which with respect to one another results in a sum of 360 degrees, according to a further example embodiment of the disclosure, the primary winding ends of the primary winding assigned to the inverter may be electrically connected to one another, for example, in what is known as a star connection or polygon connection (in the case of three phases, for example, a delta connection). Since the phase-shifted voltages at the primary winding ends at the star point cancel one another out, all of the primary winding ends may in this case also be electrically connected to one another at a star point or analogously in a polygon connection (in the case of three phases in a delta connection). This example embodiment of the disclosure may comprise, for example, three-phase inverters in one special embodiment.

In the same way as the primary windings, in the context of this disclosure, a secondary winding may then also still be referred to as an individual secondary winding if it is formed by way of a series connection of sub-secondary windings. The at least one secondary winding contained in the transformer apparatus per phase likewise has a secondary winding start and end. The secondary winding start may be electrically connected to at least one phase terminal of the transformer apparatus. Transformer apparatuses usually have just one phase terminal per phase. A power distribution grid with three lines for a three-phase current system may be connected to such a transformer apparatus, for example, in the case of three-phase inverters, at accordingly three phase terminals of the transformer apparatus. Single-phase power distribution grids with two lines to which the same phase is applied (split-phase system) are also known. The power electronics device according to the disclosure could in this case, according to one example embodiment, comprise a single secondary winding that is electrically connected, at a secondary winding start, to two phase terminals of the transformer apparatus. According to another example embodiment, the power electronics device according to the disclosure could in this case however also have two secondary windings, the secondary winding start of which is electrically connected to a respective one of the two phase terminals of the transformer apparatus.

The secondary winding ends may be electrically connected to one another via a common reference potential. For example, via a neutral conductor. If the inverters are multiphase and the phases are shifted with respect to one another such that the sum of the phase shifts corresponds to 360 degrees, secondary winding ends for all of the phases may also be combined in a star connection or a polygon connection (in the case of three phases, for example, in a delta connection), for example, by virtue of combining all of the secondary winding ends in a common star connection or delta connection.

According to the feature, the primary winding of the special electrical connection is characterized more precisely by the connection of its primary winding start to exactly one phase output of an inverter. The primary winding is also essentially wound around a core section, adjoining a first core window, of a row. Essentially in this case means that essentially all of its windings are involved. All of the windings of the primary winding may also be wound around the core section. The core section may comprise, for example, one or two core limbs and/or one or two yoke sections. The primary winding may be wound continuously between the primary winding start and end or extend over mutually spaced sub-windings that are connected in series and/or in parallel with one another. The core window may be bordered, for example, by two adjacent core limbs and two opposing yoke sections. One or more shunts consisting of core material may extend through the core window. A closed magnetic circuit is made possible around the core window. According to the feature, there is at least one second primary winding of the same phase. In other words, the second primary winding is assigned to the same phase and is electrically connected, at its primary winding start, to at least one corresponding phase output of an inverter, in particular of another inverter and/or another half-bridge. When a voltage is accordingly applied, the second primary winding generates a magnetic flux around a core window of another row. The row may be oriented horizontally or vertically or in another way. According to the feature, a secondary winding of the same phase is also wound in sections around a core section adjoining the first core window and around a core section adjoining the second core window. In an equivalent circuit diagram of the transformer apparatus, this corresponds to a series connection of the leakage inductance of the first and second core window, thereby bringing about greater damping of the voltage induced in the secondary winding. A choke coil arranged in the special electrical connection may thereby be dimensioned to be particularly small or be dispensed with entirely. This saves on material costs and losses. In addition to the first and at least second primary winding, one or more further secondary windings arranged in this way may also be present. Since the primary winding of the special electrical connection is electrically connected to exactly one inverter, the absence of the choke coil does not result in any undesired circulating currents to other inverters. The inverter cannot have any electrical connections to other primary windings, in particular at the associated phase output. By way of example, the inverter may be connected to the transformer apparatus on the primary side at all of the phase outputs solely by way of a special electrical connection. It is also possible for all or essentially all of the inverters of the power electronics device to be connected to the transformer apparatus on the primary side solely via special electrical connections, in particular in accordance with the number of phase outputs. The choke coils may thus be dimensioned to be smaller or be dispensed with entirely. Regardless of the choke coils, in this case output losses no longer occur as soon as one of the power electronics stages (stack) has reached its maximum output current. The choke coils known from the prior art downstream of a phase output are often part of an LCL filter or LC filter. Such filters are also referred to as sinusoidal filters. According to the disclosure, for the special electrical connection, both the choke coil and the capacitor, connected to the connection, of the sinusoidal filter may be dispensed with. By way of example, the capacitor may then be arranged on the secondary side of the transformer apparatus and, as a high-voltage capacitor, is able to be dimensioned to be much smaller. This enables a further reduction in costs.

The at least two inverters of the power electronics device may be designed to be locally isolated from one another or at least partially designed as a structural unit. If the power electronics device has n phases, each of the at least two inverters may have a corresponding number of half-bridges and phase outputs, wherein the power paths, arranged inside the inverters, between the half-bridges and the phase outputs may each be designed to be free from choke coils.

In the case of a power electronics device according to the disclosure, in comparison with the example given above of a power electronics device according to the prior art, according to the disclosure, instead of a single primary winding, at least two primary windings that are inductively coupled to a common secondary winding are present. Another conceivable example embodiment of a power electronics device according to the prior art could comprise a number of inverters that feed an AC voltage into a power distribution grid separately from one another via separate transformers. The transformer unit theoretically composed of these separate transformers would not ensure sufficient damping, such that, in the case of power electronics devices of the type from the prior art mentioned at the outset, damping of the output voltage by way of the what are known as sinusoidal filter chokes is inevitable.

A transformer apparatus according to the disclosure may be constructed, for example, from a number of separate transformers that corresponds to the number of inverters, by virtue of the transformers being electrically connected on the primary side to a respective one of the inverters and the secondary windings of the transformers being connected in series in each phase before they are routed to the grid connection point.

Advantageous embodiments of the disclosure are specified in the following description and the dependent claims, the features of which may be applied individually and in any combination with one another.

There may advantageously be provision for the secondary winding of the same phase to be wound in sections around a core section adjoining the first core window and around a core section adjoining the second core window, wherein the core sections are spaced from the respective other core window.

This embodiment of the disclosure makes it possible to provide an independent choice for the number of windings of the secondary winding section for the first and second core window.

It may also be considered to be advantageous for it to be the case for the special electrical connection that the core sections around which the primary winding, which is connected, at its primary winding start, to the special electrical connection, and the at least second primary winding and the secondary winding are wound are core limbs.

This embodiment of the disclosure allows the rows to be designed in the form of standard transformer cores. The yoke connections, facing one another, of the standard transformer cores may be formed jointly or be arranged adjacent to one another or spaced from one another. Depending on the number of phases of the inverters, these may be, for example, single-phase or multiphase transformer cores that are formed with a core or jacket design. The at least one secondary winding belonging to the at least one special electrical connection then extends, unlike the known standard winding arrangements, over at least two, in particular over all, of the standard transformer cores.

There may furthermore advantageously be provision for the special electrical connection to be free from coils, in particular from choke coils.

The power electronics device according to the disclosure enables the damping function to be moved into the transformer apparatus for the special electrical connection, such that the usual choke coil in the special electrical connection may be dispensed with. This makes it possible to reduce the manufacturing costs and the resultant heat loss in the core material of the choke coil, as well as the additional winding losses. A usual capacitor that is arranged with the usual choke coil as part of an LC or LCL filter may in particular also be dispensed with for the special electrical connection and may be arranged, for example, on the secondary side of the transformer apparatus. The at least one inverter may in particular also be free from choke coils downstream of the half-bridges contained in the inverter.

There may furthermore advantageously be provision for the at least one phase output of the at least two inverters to be connected to the transformer apparatus on the primary side via a special electrical connection.

According to this embodiment of the disclosure, all of the choke coils usually arranged between the inverters and the transformer apparatus may be dispensed with. According to this embodiment of the disclosure, the power electronics device thus comprises at least as many primary windings as inverters. This makes it possible to use choke coils of smaller dimensions or to save on the otherwise usual choke coils or the entire sinusoidal filter. The phase terminals of the transformer apparatus of the inventive embodiment of the power electronics device may be electrically connected to one another via a star connection of capacitors or via a polygon connection of capacitors (in the case of three phases via a delta connection of capacitors). This allows additional damping on the secondary side with smaller and less expensive capacitors than in the case of the usual sinusoidal filters from the prior art. The at least one phase output of the at least two inverters may in particular be connected to the transformer apparatus on the primary side by way of exactly one special electrical connection. In this case, the number of primary windings corresponds to the number of inverters. The core arrangement may comprise as many rows as inverters, such that the primary windings assigned to an inverter are able to be wound around core sections of a common row.

A further advantageous embodiment of the disclosure may make provision for the transformer apparatus to comprise fewer secondary windings than inverters per phase, in particular exactly one secondary winding per phase.

According to this embodiment of the disclosure, the secondary winding may be inductively coupled to at least two primary windings of the phase and extend, for example, over at least two rows. This increases the damping for each of the secondary windings. The at least two primary windings may be electrically connected to separate sets of the inverters. This allows the separate sets of inverters to be clocked in a manner shifted with respect to one another. By way of example, the secondary winding may be inductively coupled to all of the primary windings of the phase, which may in particular be electrically connected to separate sets of the inverters. The secondary winding may extend, for example, over at least two, in particular essentially over all or all of the rows of the core arrangement.

According to one advantageous embodiment of the disclosure, the at least two inverters may be configured and designed such that, during operation, the phases of each inverter have a phase shift with respect to one another, such that the sum of the phase shifts corresponds to 360 degrees, and the primary winding ends of the primary windings electrically connected to an inverter are electrically connected to one another, in particular at a star point or in a polygon connection, which corresponds to a delta connection in the case of three phases.

According to this embodiment of the disclosure, all of the primary winding ends may also be electrically connected to one another at a common star point or in a polygon connection, since the voltages cancel one another out.

It may also be considered to be advantageous for the at least two inverters to be three-phase inverters.

Three-phase power grids are widespread and make it possible, for example, to supply three-phase current.

There may furthermore advantageously be provision for the secondary winding ends to be electrically connected to one another, in particular at a star point.

The secondary winding ends may be electrically connected to one another via a neutral conductor or earth. If the phases are shifted with respect to one another such that the sum of the phase shift results in 360 degrees, the secondary winding ends may be connected to one another, for example, at a star point by way of a star connection, since the voltages cancel one another out. They could however also be electrically connected to one another by way of a polygon connection, which corresponds to a delta connection in the case of three phases. According to a further embodiment of the disclosure, the secondary windings themselves may also be electrically connected to one another in a polygon connection, which corresponds to a delta connection in the case of three phases.

One advantageous embodiment of the disclosure may make provision for the transformer apparatus to comprise at least two phase terminals on the secondary side, wherein the phase terminals are each designed for the connection of a line of a power distribution grid, and the phase terminals of the transformer apparatus are electrically connected to one another by way of a star connection of capacitors or by way of a delta connection of capacitors.

This embodiment of the disclosure is suitable for phase shifts whose sum corresponds to 360 degrees. The capacitors bring about additional damping and, unlike the sinusoidal filters from the prior art, may be dimensioned to be much smaller. However, they should have a voltage rating adapted to the power grid. The feed lines of the star connection of capacitors or the delta connection of capacitors may branch off from the lines, connected to the phase terminals, of the power distribution grid or from the lines that extend inside the transformer apparatus from the phase terminals to the winding starts of the secondary windings. The capacitors do not necessarily have to be arranged outside the transformer apparatus. By way of example, the capacitors may also be accommodated in the transformer apparatus tank. This reduces installation expenditure. The delta connection of capacitors is suitable for a power electronics device having three-phase inverters.

It may also be considered to be advantageous for the core arrangement to comprise a stack of single-phase or multi-phase transformer cores that are formed with a core or jacket design, wherein the transformer cores are arranged in a row in the direction of the core limbs with yoke connections facing one another, and the adjacent yoke connections are formed together and/or are arranged adjacent to one another and/or parallel and spaced from one another.

When manufacturing the core arrangement as an integrated magnetic component, according to this embodiment of the disclosure, inexpensive standard components may be used, these being suitably connected to one another and/or jointly forming yoke connections. In the context of this disclosure, the core arrangement may be formed of a plurality of components in combined form or be formed in one piece.

There may furthermore advantageously be provision for at least one yoke connection, arranged between core limbs of two adjacent rows, for forming a leakage channel for transverse fluxes to comprise an insert made from ferromagnetic material or to consist of ferromagnetic material.

The yoke connection may for example, comprise a plurality of such inserts.

There may advantageously also be provision for at least one yoke connection, arranged between core limbs of two adjacent rows, to have a thickness pointing parallel to the core limbs that is equal to or less than the thickness of the yoke connections terminating the core arrangement.

According to this embodiment of the disclosure, the two adjacent rows share a common yoke connection. The yoke connection may extend over the entire length of the row. This embodiment saves on material costs.

There may furthermore advantageously be provision for the number of rows to correspond to the number of inverters, wherein each row comprises a number of primary windings corresponding to the number of phases, and these primary windings are connected to a corresponding phase output of a common inverter via a special electrical connection.

The embodiment makes it possible to dispense with all of the choke coils of the usual sinusoidal filters and manages with a particularly small number of primary windings. Exactly one secondary winding may in particular be provided per phase.

One advantageous development of the disclosure may make provision for a controller to be included, which is designed and configured such that, during operation of the power electronics device, the clocking of the inverters is at least temporarily shifted with respect to one another such that, for at least one special electrical connection, the sum of the voltage present at the primary winding start of the primary winding and the voltage present at the at least second primary winding to the same secondary winding corresponds to a voltage profile with a higher clock frequency than the clock frequencies of the voltage profiles of the individual voltages.

According to this embodiment of the disclosure, a voltage with a voltage profile with a higher clock frequency than the clock frequencies of the voltage profiles of the individual voltages is induced in the secondary winding belonging to the at least one special electrical connection, wherein one of the two individual voltages is present at the primary winding start of the primary winding connected to the special electrical connection and inductively coupled to the secondary winding, and the other of the two individual voltages is present at the primary winding start of the at least second primary winding, which is likewise coupled to the secondary winding according to the definition of the special electrical connection. Since the damping effect of a winding increases with frequency, the damping is able to be further increased by way of the embodiment of the disclosure. The two individual voltages present at the two primary windings have voltage profiles whose envelope is sinusoidal, and correspond to the same phase. Or, in other words, the voltages present at the primary windings are pulse-width-modulated clock voltages that, when filtered, resemble the sinusoidal profile. With correspondingly high damping of the high-frequency components in the voltage profiles, an approximately sinusoidal voltage profile is made possible on the secondary winding. The pulse-width-modulated clock voltages have pulses in the voltage profile that are, for example, rectangular-wave and have different widths owing to the pulse width modulation. The clock frequency of the voltage profile denotes the frequency at which the pulses occur in the voltage profile, for example, the leading edges of these pulses. This frequency does not have to be constant. In the present embodiment, during operation of the power electronics device, the clocking of the inverters is at least temporarily shifted with respect to one another such that the sum of the two individual voltages (which is only considered theoretically and is not actually present anywhere) corresponds to a voltage profile with a higher clock frequency. The pulses of the voltage profiles of the individual voltages are thus shifted with respect to one another such that the sum of the two voltage profiles theoretically corresponds to a higher number of pulses per time in the voltage profile. The shift in the clocking is therefore not such that the pulses of the two voltage profiles end up being coincident with another.

If the inventive development of the disclosure is based on a power electronics device according to the previous embodiment and includes exactly one secondary winding per phase, particularly high damping is able to be achieved by way of a time shift in the clock frequencies—that is to say a time offset of the clock edges per phase—of all of the inverters.

A further object of the disclosure is to specify a method of the type mentioned at the outset by way of which said disadvantages of the prior art are able to be at least partially reduced or completely avoided.

According to the disclosure, the method for damping high-frequency components in the output current of a power electronics device is performed using a power electronics device that comprises an inverter arrangement and a transformer apparatus. The inverter arrangement is electrically connected to the transformer apparatus on the primary side. Two primary windings are inductively coupled to a common secondary winding in the transformer apparatus at least for a first phase. In the method, during operation of the power electronics device, output voltages of the same phase/having the same phase, but with a different voltage profile, are at least temporarily applied to at least the two primary windings by the inverter arrangement, by virtue of the inverter arrangement being driven with clock edges that are time-shifted with respect to one another with respect to the two output voltages, such that the sum of the two output voltages corresponds to a voltage profile with a higher clock frequency than the clock frequencies of the voltage profiles of the two individual output voltages.

The output voltages are assigned to the same phase. By way of example, this may be the output voltage of two half-bridges of the inverter arrangement, which are clocked in a manner temporally offset from one other, wherein a sinusoidal profile of the same phase position arises as the envelope of the output signal for both output signals by way of pulse width modulation and the clocking still takes place in a time-shifted manner, such that the sum of the two output signals corresponds to a higher clock frequency in the voltage profile, the envelope of which is not shifted with regard to the phase position. The sum of the two output signals is present at neither one nor the other primary winding. In the secondary winding, however, due to the winding structure, a voltage is partially induced per transformer core row, which voltages therefore consist overall of the sum of the individual row voltages, such that a correspondingly higher damping of the output signal occurs in the secondary winding. The method may in particular be performed using a power electronics device in which more than two primary windings are inductively coupled to a common secondary winding in the transformer apparatus for at least a first phase. In this case, different output voltages of the inverter arrangement may be applied to the more than two primary windings, by virtue of the inverter arrangement being driven with clock edges that are time-shifted with respect to one another with respect to the more than two output voltages, such that the clock frequency of the voltage profile of the sum of the more than two output voltages corresponds to a higher clock frequency than the clock frequency of the individual output voltages. With regard to the definition of a clock frequency of a voltage profile, reference is made to the above explanations. If all of the secondary windings of the power electronics device are inductively coupled to a plurality of primary windings, such different clocking of the primary windings may take place for all of the secondary windings. The inverter arrangement may be an integrated structural unit. The inverter arrangement may however also comprise separately arranged inverters.

With regard to the method, reference is also made to the definitions, explanations, possible embodiments and example embodiments regarding the device claims, which may also be applied analogously to the method.

A further object of the disclosure is to specify a transformer apparatus of the type mentioned at the outset by way of which said disadvantages of the prior art are able to be at least partially reduced or completely avoided.

To this end, the transformer apparatus comprises a core arrangement and at least two primary windings and at least one secondary winding, wherein the primary windings and the at least one secondary winding wind around the core arrangement at least in sections, wherein the transformer apparatus is configured and designed such that it is able to be used as a transformer apparatus of the power electronics device.

With regard to the transformer apparatus, reference is also made to the definitions, explanations, possible embodiments and example embodiments regarding the device claims, which may also be applied analogously to the transformer apparatus.

BRIEF DESCRIPTION OF THE DRAWINGS

Further expedient embodiments and advantages of the disclosure are the subject of the description of example embodiments of the disclosure with reference to the figures of the drawing, the same reference symbols referring to functionally identical components.

In the figures.

DETAILED DESCRIPTION

The disclosure relates to a power electronics device having at least two inverters and a transformer apparatus. The inverters are connected on the AC side to the transformer apparatus, and the transformer apparatus is able to be connected on the secondary side to a power distribution grid. In order to transform a voltage level or for galvanic isolation between the inverters and the power distribution grid, the transformer apparatus comprises a core arrangement, at least one primary winding and at least one secondary winding that wind around the core arrangement at least in sections.

The disclosure also relates to a transformer apparatus that is able to be used as a transformer apparatus of the power electronics device.

The disclosure also relates to a method for damping high-frequency components in the output current of a power electronics device. The method may be performed using the power electronics device according to the disclosure.

Figure 1:
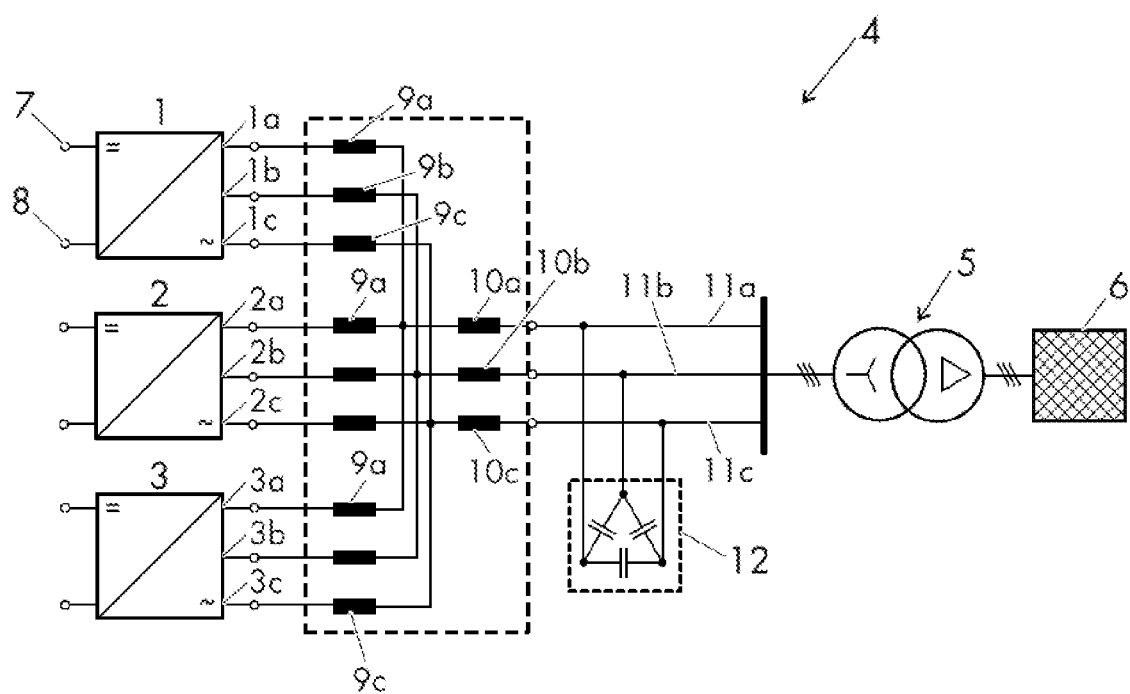
FIG. 1 shows a schematic circuit diagram of a power electronics device according to the prior art.

FIG. 1 shows a circuit diagram of a power electronics device 4 according to the prior art. The power electronics device 4 comprises three three-phase inverters 1, 2, 3, which are electrically connected on the AC side to a transformer 5 on the primary side. The transformer 5 is electrically connected on the secondary side to a power distribution grid 6, which is at a higher voltage level. The inverters 1, 2, 3 each have a positive pole 7 and negative pole 8 on the input side, each of which may be connected to a generator (not shown) that generates DC voltage. The inverters 1, 2, 3 that are shown comprise three half-bridges (not illustrated), which are fed by the DC voltage present on the input side of the inverter, and provide a respective output voltage at the phase outputs 1a, 1b, 1c or 2a, 2b, 2c or 3a, 3b, 3c, which output voltages are phase-shifted by 120 degrees with respect to one another. The output voltages present at the phase outputs have a sinusoidal profile with high-frequency components, for which reason sinusoidal filter chokes 9a, 9b, 9c and 10a, 10b, 10c for damping these high-frequency components are connected downstream of the phase outputs 1a, 1b, 1c, etc. in the electrical connections 11a, 11b, 11c between the inverters 1, 2, 3 and the transformer 5. The phase outputs 1a, 2a, 3a of the same phase are electrically connected to one another via the sinusoidal filter choke 9a and are connected to the transformer 5 on the primary side via the further sinusoidal filter choke 10a. The same applies to the other phase outputs. To increase the damping, the three electrical connections 11a, 11b, 11c are connected to one another via a delta connection 12 of capacitors, wherein the capacitors and the sinusoidal filter chokes form an LC filter.

Figure 2:
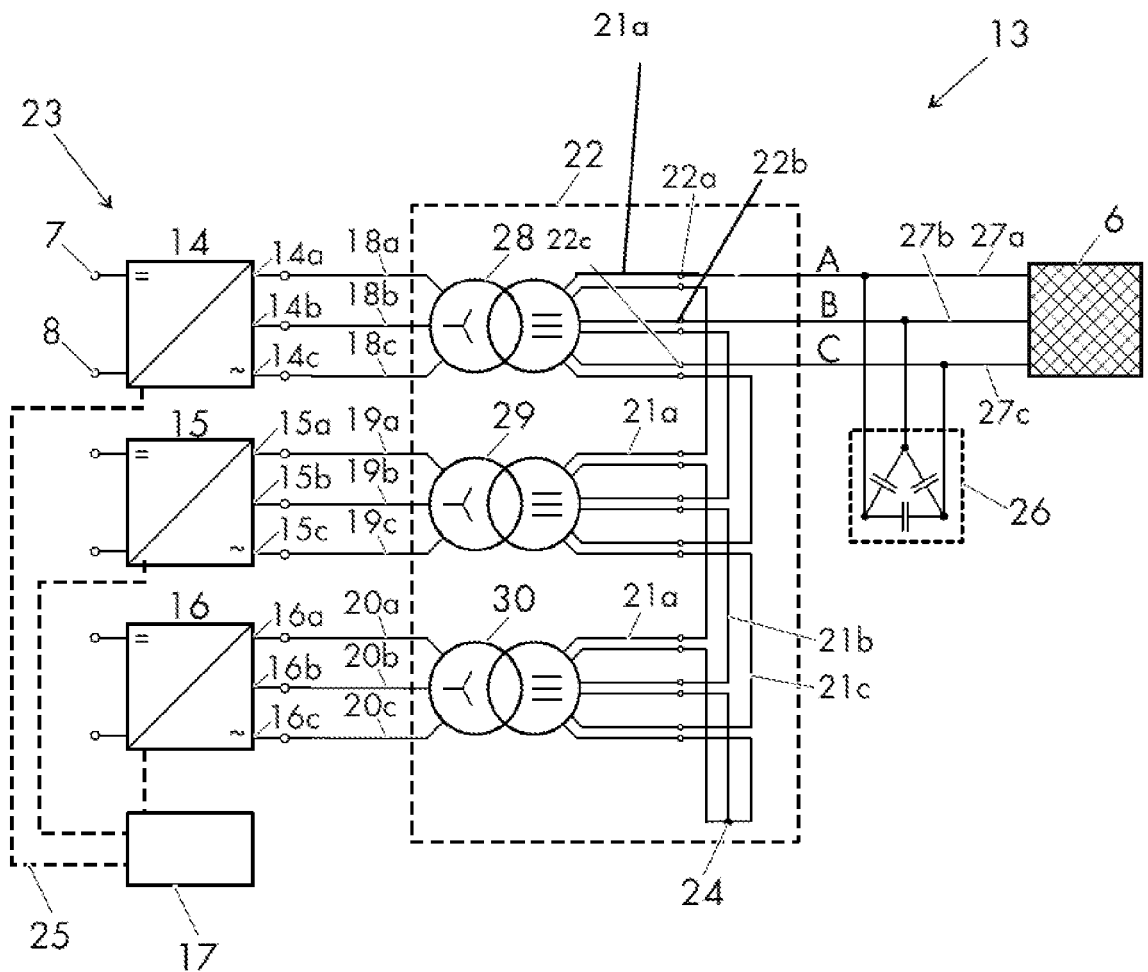
FIG. 2 shows a schematic circuit diagram of a power electronics device according to a first example embodiment of the disclosure.

FIG. 2 shows a schematic illustration of a circuit diagram of a power electronics device 13 according to a first example embodiment of the disclosure. The power electronics device 13 has three three-phase inverters 14, 15 and 16, which are each connected to one or more generators (not illustrated) that generate DC voltage via a positive pole 7 and a negative pole 8. The inverters 14, 15, 16 form an inverter arrangement 23. The inverters 14, 15, 16 are connected to a transformer apparatus 22 on the primary side, which transformer apparatus is connected on the secondary side to a power distribution grid 6.

The power distribution grid 6 provides a three-phase current system for consumers (not illustrated) and has three lines 27a, 27b and 27c for the three phases A, B, C of the three-phase current, wherein the three lines 27a, 27b and 27c are connected to phase terminals 22a, 22b, 22c of the transformer apparatus 22. The lines of the power distribution grid 6 are electrically connected to one another via a delta connection 26 of capacitors, such that the phase terminals 22a to 22c of the transformer apparatus 22 are also electrically connected to one another via this delta connection.

The transformer apparatus 22 has three transformer subunits 28, 29, 30, each of which is assigned to an inverter. For each of the three phase outputs 14a to 16c of the assigned inverter, exactly one primary winding (not illustrated) is contained in the transformer subunit, the primary winding start (not illustrated) of which is electrically connected to the associated phase output via a special electrical connection 18a to 20c and is free from choke coils. The phase outputs 14a to 16c of the inverters are therefore all connected to a primary winding start (not illustrated) of a primary winding (not illustrated), assigned to the phase output, of the transformer apparatus 22 via exactly one special electrical connection, and the transformer apparatus 22 has nine primary windings, corresponding to the number of phase outputs. The primary winding ends (not illustrated—see FIG. 5) of the primary windings (not illustrated—see FIG. 5) of each transformer subunit 28, 29, 30 are combined at a star point (not illustrated—see FIG. 5). The transformer apparatus 22 comprises exactly one secondary winding 21a, 21b and 21c per phase. The secondary winding ends of the three secondary windings 21a, 21b and 21c are combined at a common star point 24. Each of the secondary windings 21a, 21b and 21c runs through all three transformer subunits 28, 29 and 30 and is inductively coupled, according to its phase, to the primary windings, arranged in the transformer subunit 28, 29, 30, of this phase. By way of example, the secondary winding 21a is inductively coupled to the three primary windings whose primary winding starts are connected to the phase outputs 14a, 15a, 16a.

The phases A, B, C have a phase shift of 120 degrees with respect to one another, such that the sum of this phase shift corresponds to 360 degrees. In order to additionally increase the damping of the output voltages of the inverters 14, 15 and 16, the power electronics device 13 comprises a controller 17. The controller 17 is connected to the inverters 14, 15 and 16 via control lines 25 and is designed and configured, during operation of the power electronics device 13, to at least temporarily shift the clocking of the half-bridges of the inverters 14, 15, 16 with respect to one another such that, for each phase A, B and C, the sum of the voltages present at the primary winding start of the primary windings belonging to this phase corresponds to a voltage profile with a higher clock frequency than the clock frequencies of the voltage profiles of the individual voltages present at these primary windings. To this end, the controller 17 may for example, transmit corresponding control signals to a control device (not illustrated) of the inverters 14, 15, 16. The thus-shifted clocking of the inverters 14, 15, 16 with respect to one another induces sinusoidal voltages with particularly high-frequency components in the secondary windings 21a, 21b, 21c. Since the damping effect of the secondary windings 21a, 21b, 21c increases with frequency, the power electronics device 13 enables particularly good damping of the high-frequency components in the output current of the power electronics device 13.

Figure 3:
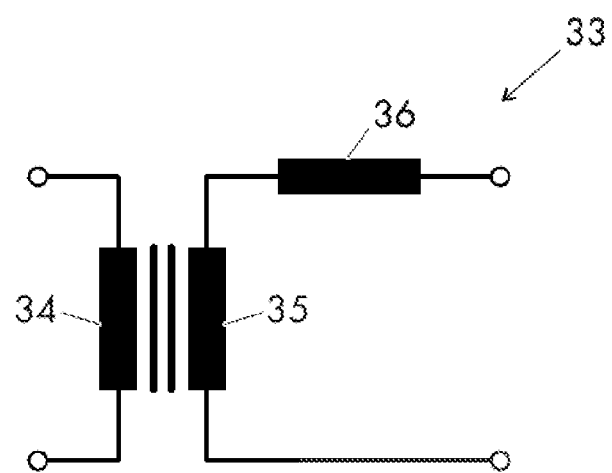
FIG. 3 shows a simplified equivalent circuit diagram for a single-phase transformer according to the prior art, taking into account the leakage inductance.

FIG. 3 shows a simplified equivalent circuit diagram of a single-phase transformer 33 according to the prior art. The transformer 33 has a primary winding 34, a secondary winding 35 and a leakage inductance 36.

Figure 4:
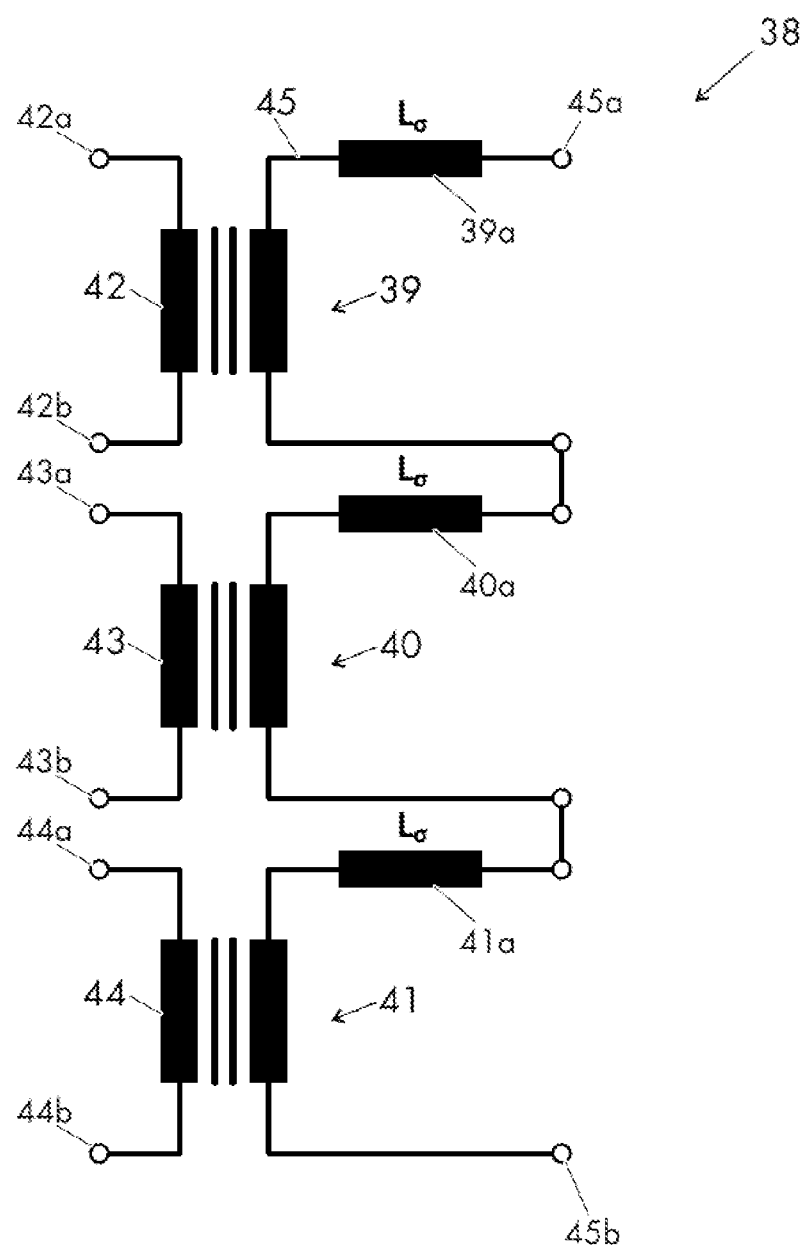
FIG. 4 shows an equivalent circuit diagram for a single-phase transformer apparatus according to a second example embodiment of the disclosure.

FIG. 4 shows an equivalent circuit diagram of a single-phase transformer apparatus 38 according to a second example embodiment of the disclosure. The transformer apparatus 38 comprises three transformer subunits 39, 40 and 41, each of which has a primary winding 42, 43, 44. The primary windings 42, 43, 44 each extend from a primary winding start 42a, 43a, 44a to a primary winding end 42b, 43b, 44b and are all inductively coupled to a common secondary winding 45, which extends via the three transformer subunits 39, 40 and 41 and has a secondary winding start 45a and a secondary winding end 45b. The leakage inductance and thus the damping properties of the transformer apparatus 38 are represented in the equivalent circuit diagram by a series connection of the leakage inductances 39a, 40a, 41a of the transformer subunits 39, 40, 41.

Figure 5:
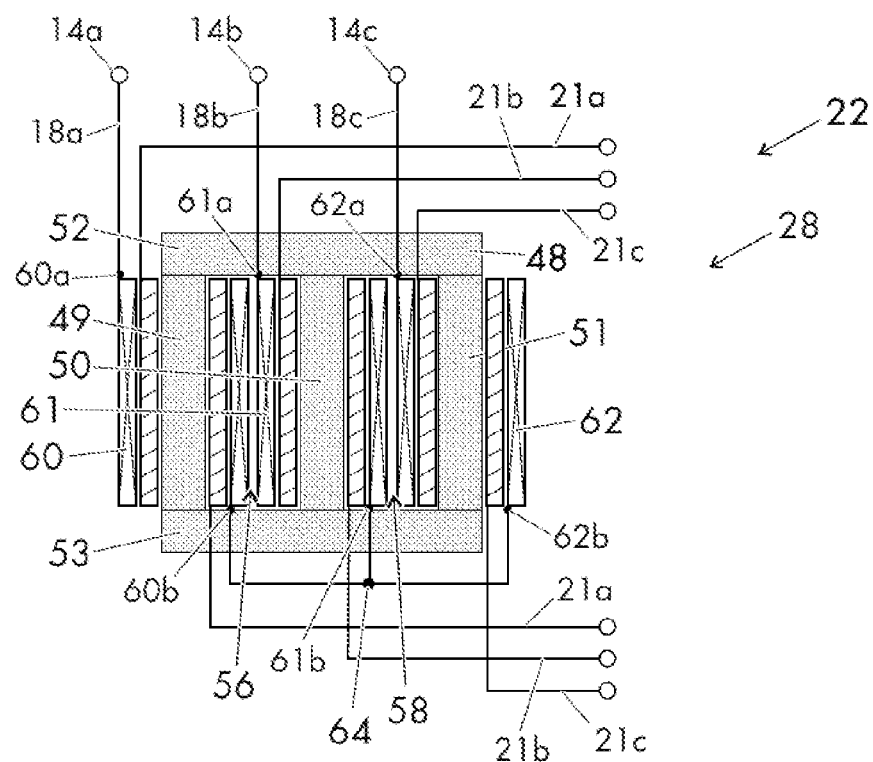
FIG. 5 shows an extract of the transformer apparatus illustrated in FIG. 2 in the region of the transformer subunit 28 according to the first example embodiment of the disclosure in a sectional view and in a schematic illustration.

FIG. 5 shows an extract of the transformer apparatus 22 illustrated in FIG. 2 in the region of the transformer subunit 28 in a sectional view and in a schematic illustration. A section of the core arrangement 48 of the transformer apparatus 22 is illustrated, which section is formed of a row of core limbs 49, 50, 51 arranged adjacent to one another and two yoke connections 52, 53. The yoke connections 52, 53 connect the core limbs 49, 50, 51 to one another. In the extract that is illustrated, the core arrangement 48 has two core windows 56, 58 and is wound around in a core arrangement by three primary windings 60, 61, 62, wherein the primary winding 60 is wound around the core limb 49 adjoining the core window 56, the primary winding 61 is wound around the core limb 50 adjoining the core windows 56 and 58 and the primary winding 62 is wound around the core limb 51 adjoining the core window 58. The three core limbs 49, 50, 51 are each also wound around by a section of the secondary winding 21a, 21b and 21c. The sections of the secondary windings 21a, 21b and 21c are wound around the primary windings 60, 61, 62 in the example illustrated. The sections of the secondary windings could however alternatively also be wound around by the primary windings or be arranged in alternating layers therewith on the respective core limbs. The primary windings 60, 61, 62 comprise primary winding starts 60a, 61a and 62a, which are connected to the associated phase outputs 14a, 14b and 14c of the inverter 14 (not illustrated) via the special electrical connections 18a, 18b, 18c according to their phase association. The primary windings 60, 61, 62 also comprise primary winding ends 60b, 61b, 62b that are connected to one another at a star point 64.

Figure 6:
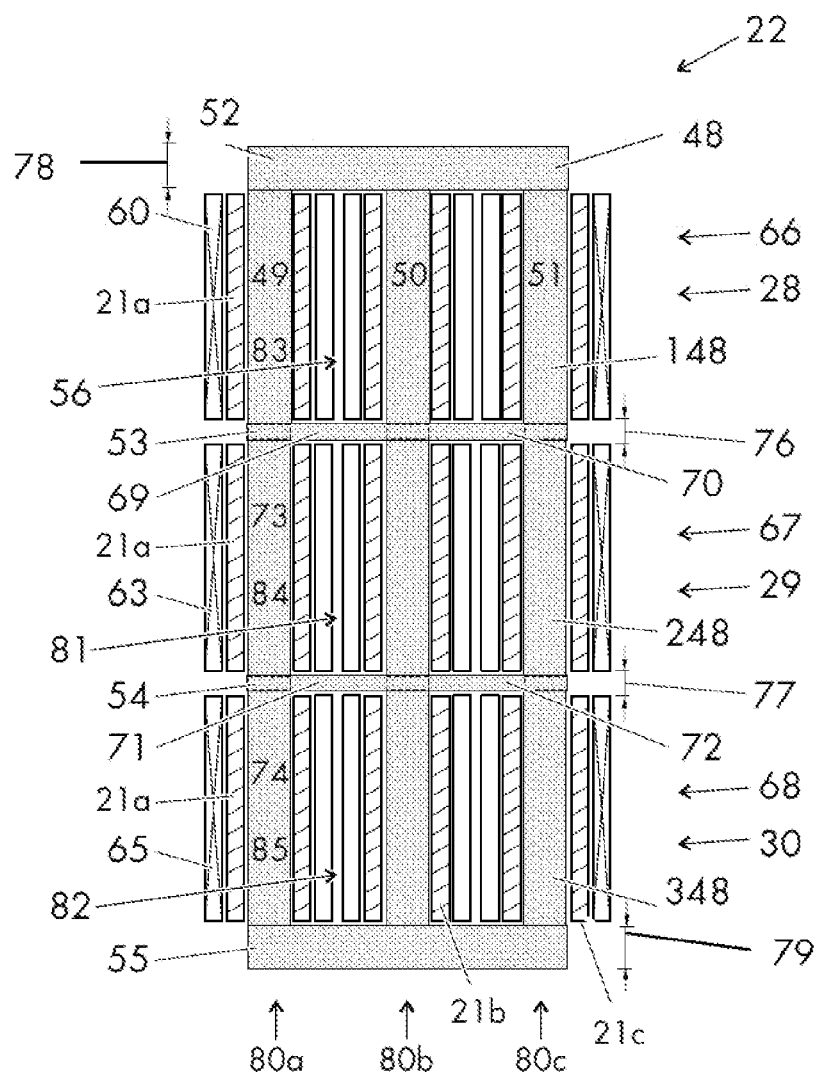
FIG. 6 shows the transformer apparatus 22 illustrated in FIG. 2 in a sectional view and in a schematic illustration.

FIG. 6 shows the transformer apparatus 22 illustrated in FIG. 2 in a sectional view and in a schematic illustration. In comparison with FIG. 5, not only is an extract of the transformer apparatus 22 illustrated, but details regarding the connections of the windings have been omitted in the figure for the sake of better clarity.

The core arrangement 48 comprises three rows 66, 67, 68 of core limbs that are arranged adjacent to one another and that are connected to one another via yoke connections in each row. In the row 66, the core limbs 49, 50 and 51 are arranged adjacent to one another and connected to one another via the yoke connections 52 and 53. The remaining core limbs and yoke connections are, if they are not necessary, not given their own reference symbols for the sake of clarity.

The structure of the core arrangement 48 corresponds to a stack of three three-phase transformer cores 148, 248, 348, which are formed with a core design, wherein the transformer cores 148, 248, 348 are arranged in a row in the direction of the core limbs with yoke connections facing one another and that are formed together. For example, the yoke connection 53 is encompassed both by the transformer cores 148 and 248 and the yoke connection 54 is encompassed by the transformer cores 248 and 348. The yoke connection 53 arranged between the core limbs of rows 66 and 67 and the yoke connection 54 arranged between the core limbs of rows 67 and 68 each comprise two inserts 69, 70 and 71, 72 made of ferromagnetic material to form leakage channels for transverse fluxes. The areas of the yoke connections 53 and 54 shown in dashed lines are each formed in one piece with adjacent core limbs. In the context of this disclosure, the feature "rows of core limbs that are arranged adjacent to one another and that are connected to one another via yoke connections in each row" is therefore not a statement with regard to a one-piece or multi-piece design of the components of the core arrangement and/or a separate and joined design of the core limbs and yoke connections. In the example embodiment shown in the figure, for example, the end faces of the core limbs are in part only theoretical dividing lines between the core limb and the yoke connection. By way of example, the core limbs 49, 73 and 74 are formed in one piece with the sections of the yoke connections 53 and 54 that extend between these core limbs and are shown in dashed lines.

The yoke connections 53 and 54 have a thickness 76, 77 pointing parallel to the core limbs that is less than the thickness 78, 79 of the yoke connections 52 and 55 terminating the core arrangement 48.

The number of rows 66, 67, 68 in this case corresponds to the number of inverters illustrated in FIG. 2 (not illustrated—see FIG. 2), wherein each row 66, 67, 68 is assigned to exactly one of the inverters (not illustrated—see FIG. 2) and each of the three phase outputs of the inverter is electrically connected to exactly one of the three primary windings of the assigned row 66, 67, 68. Primary windings that are assigned to the same phase are arranged along a column 80a, 80b, 80c of the transformer apparatus 22, wherein the secondary winding 21a, 21b, 21c belonging to this phase extends along the corresponding column 80a, 80b, 80c and is wound in sections around the core limbs of the corresponding column 80a, 80b, 80c that are wound around by the primary windings. By way of example, the core limbs 49, 73, 74 of the column 80a form core sections 83, 84, 85 around which the secondary winding 21a is wound in sections. The core sections 83, 84, 85 adjoin the core windows 56, 81, 82, wherein the core sections 83, 84, 85 are each spaced from the other two core windows and are wound around by the primary windings 60, 63 and 65. Output voltages of the inverters are applied to the primary windings of the transformer apparatus 22 during operation, wherein output voltages are applied to the primary windings arranged along a row, which output voltages have a phase shift of 120 degrees with respect to one another, and output voltages are applied to the primary windings arranged along a column 80a, 80b, 80c in order to increase a damping effect, the voltage profiles of which output voltages have pulses in the voltage profile that are at least temporarily shifted with respect to one another—that is to say, may have time-shifted edges of the pulses due to time-offset (shifted) clocking of the half-bridges, which is such that the sum of the voltages present at the primary winding start of the primary windings of a column 80a, 80b, 80c corresponds to a voltage profile of a higher clock frequency than the clock frequencies of the voltage profiles of the individual voltages. As a result of the inventive connection of the inverters (not illustrated—see FIG. 2) to the transformer apparatus 22, no disruptive circulating currents form between the inverters, despite the lack of choke coils in the special electrical connections (not illustrated—see FIGS. 2 and 5), not even in the case of shifted clocking of the half-bridges (not illustrated—see FIGS. 2 and 5), connected upstream of the phase outputs, of the same phase with respect to one another.

Figure 7:
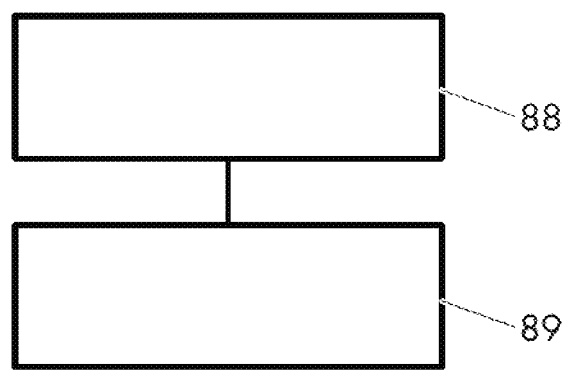
FIG. 7 shows a flowchart of a method according to a third example embodiment of the disclosure.

FIG. 7 shows a flowchart of a method according to a third example embodiment of the disclosure. The method is used to damp high-frequency components in the output current of a power electronics device. The method is performed in a first method step 88 using a power electronics device that comprises an inverter arrangement and a transformer apparatus, and the inverter arrangement is electrically connected to the transformer apparatus on the primary side, and at least two primary windings are inductively coupled to a common secondary winding in the transformer apparatus at least for a first phase. In a second method step 89, during operation of the power electronics device, different output voltages of the inverter arrangement are at least temporarily applied to at least the two primary windings, by virtue of the inverter arrangement being clocked/switched with clock edges that are shifted with respect to one another with respect to the two output voltages, such that the sum of the two output voltages corresponds to a voltage profile with a higher clock frequency than the clock frequency of the voltage profiles of the individual output voltages.

Figure 8:
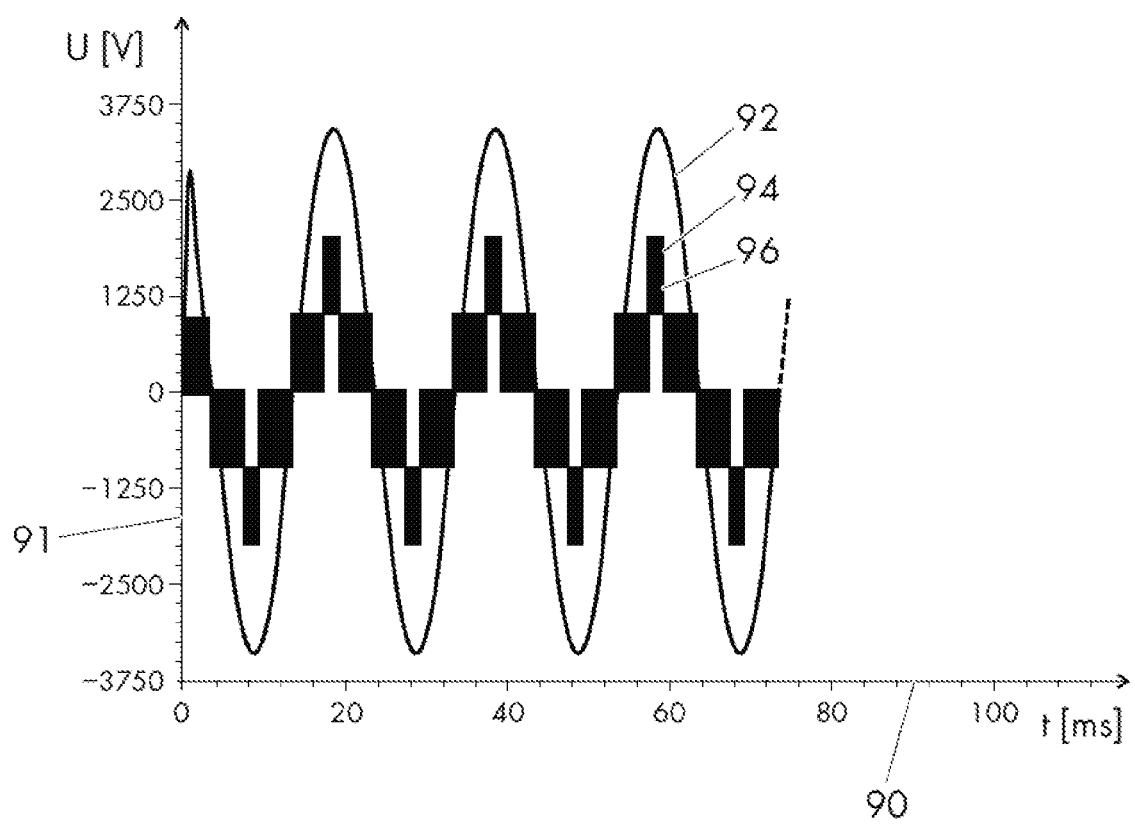
FIG. 8 shows a graph to illustrate the method according to FIG. 7.

FIG. 8 shows a graph on the x-axis 90 of which the time t [ms] is plotted and on the y-axis 91 of which a voltage is plotted in voltage units. The voltage profile 92 and 94 is intended to illustrate the method shown in FIG. 7. The voltage profile 92 corresponds to a voltage profile that drops across the secondary winding that is inductively coupled to the at least two primary windings. The voltage profile 94 corresponds to the sum of the output voltages present at the at least two primary windings, which output voltages have pulses that are shifted with respect to one another in the voltage profile. The shift of the pulses in the voltage profile leads to compression of the rectangular-wave voltage profiles produced in the pulse width modulation, such that the sum of the output voltages 96 corresponds to a voltage profile with a higher clock frequency than the clock frequencies of the voltage profiles of the individual voltages. The clock frequency of the voltage profile 94 is in this case so high that, in the selected illustration, the rectangular-wave voltage profiles appear as areas formed in the manner of a mosaic. In the case of a higher resolution, each rectangle of the mosaic would be represented as a high-frequency rectangular-wave voltage profile.

The invention claimed is:

1. A method for damping high-frequency components in an output current of a power electronics device having an inverter arrangement comprising at least two inverters and a transformer apparatus, wherein the inverter arrangement is electrically connected to the transformer apparatus on a primary side thereof, wherein at least two primary windings are inductively coupled to a common secondary winding in the transformer apparatus at least for a first phase, comprising:

during operation of the power electronics device, temporarily applying output voltages of a same phase but with a different voltage profile of the at least two inverters to at least the two primary windings, by virtue of the at least two inverters being driven with clock edges that are time-shifted with respect to one another with respect to the at least two output voltages, such that a sum of the at least two output voltages corresponds to a voltage profile with a higher clock frequency than clock frequencies of voltage profiles of the at least two output voltages individually.

2. The method of claim 1, wherein in the power electronics device comprising the at least two inverters and the transformer apparatus:

the at least two inverters are electrically connected on an AC side thereof to the transformer apparatus on the primary side thereof, and the transformer apparatus is configured to be electrically connected on a secondary side thereof to a power distribution grid, the transformer apparatus comprises a core arrangement, the at least two primary windings including a first primary winding and at least one second primary winding, and at least one secondary winding wind around the core arrangement at least in sections, the core arrangement comprises at least two rows of core limbs arranged adjacent to one another, wherein the core limbs are connected to one another via yoke connections in each row, wherein at least two special electrical connections are present, each between a phase output of an inverter and a primary winding start of one of the at least two primary windings of the transformer apparatus, wherein the following applies to the at least two electrical connections, the primary winding start of the first primary winding is electrically connected to exactly one phase output of one of the inverters and the first primary winding is essentially wound around a core section, adjoining a first core window, of a row, and the at least one second primary winding, electrically connected to at least one of the inverters, of the same phase is wound around a core section adjoining a second core window of another row, which core section is spaced from the first core window, wherein a secondary winding of the same phase of the at least one secondary winding is wound in sections around the core section adjoining the first core window and around the core section adjoining the second core window.

3. The method of claim 2, wherein the secondary winding of the same phase is wound in sections around the core section adjoining the first core window and around the core section adjoining the second core window, wherein each of the core sections are spaced from one another.

4. The method of claim 2, wherein in the at least two special electrical connections, core sections around which the first primary winding, which is connected, at its primary winding start, to one of the at least two special electrical connections, and the at least one second primary winding and the secondary winding are wound, are core limbs.

5. The method of claim 2, wherein each of the at least two special electrical connections is free from coils.

6. The method of claim 2, wherein for each of the at least two inverters at least one phase output is connected to the transformer apparatus on the primary side via a special electrical connection.

7. The method of claim 2, wherein the transformer apparatus comprises one secondary winding per phase.

8. The method of claim 2, wherein the at least two inverters are configured such that, during operation, phases of each inverter have a phase shift with respect to one another, such that the sum of the phase shifts corresponds to 360 degrees, and primary winding terminals of the primary windings electrically connected to an inverter are electrically connected to one another at a star point or in a delta connection.

9. The method of claim 2, wherein the at least two inverters are three-phase inverters.

10. The method of claim 2, wherein the secondary winding ends are electrically connected to one another at a star point.

11. The method of claim 2, wherein the transformer apparatus comprises at least two phase terminals on the secondary side, which phase terminals are each designed for the connection of a line of a power distribution grid, wherein the phase terminals of the transformer apparatus are electrically connected to one another by way of a star connection of capacitors or a delta connection of capacitors.

12. The method of claim 2, wherein the core arrangement comprises a stack of single-phase or multiphase transformer cores that are formed in a core or jacket design, wherein the single-phase or multiphase transformer cores are arranged in a row in the direction of the core limbs with yoke connections facing one another, and adjacent yoke connections are formed together and/or are arranged adjacent to one another and/or parallel and spaced from one another.

13. The method of claim 2, wherein at least one yoke connection, arranged between core limbs of two adjacent rows, for forming a leakage channel for transverse fluxes comprises an insert made from ferromagnetic material.

14. The method of claim 2, wherein at least one yoke connection, arranged between core limbs of two adjacent rows, has a thickness pointing parallel to the core limbs that is equal to or less than the thickness of the yoke connections terminating the core arrangement.

15. The method of claim 2, wherein the number of rows corresponds to the number of inverters, wherein each row comprises a number of primary windings corresponding to the number of phases, and these primary windings are connected to a corresponding phase output of a common inverter via a special electrical connection.

16. The method of claim 2, wherein a controller is included, which is designed and configured such that, during operation of the power electronics device, a clocking of the inverters is at least temporarily shifted with respect to one another such that, for at least one special electrical connection, the sum of a voltage present at first the primary winding and a voltage present at the at least second primary winding associated with the same secondary winding corresponds to a voltage profile with a higher clock frequency than the clock frequencies of the voltage profiles of the voltages individually.

17. The method of claim 2, wherein the transformer apparatus comprises a plurality of separate transformers that correspond, respectively, to the at least two inverters, and wherein each of the plurality of separate transformers are electrically connected on a primary side thereof to a respective one of the inverters and wherein each of the plurality of separate transformers on a secondary side thereof is connected together in series in each phase, respectively, prior to connection to a grid connection point.

* * * * *